United States Patent
Wang et al.

(10) Patent No.: US 9,386,609 B2
(45) Date of Patent: Jul. 5, 2016

(54) WIFI NETWORK BRIDGE, AND WIFI-BASED COMMUNICATION METHOD AND SYSTEM

(75) Inventors: Xuesong Wang, Shenzhen (CN); Di Dou, Shenzhen (CN); Xiyu Wang, Shenzhen (CN); Xiong Tang, Shenzhen (CN); Xuejin Zheng, Shenzhen (CN)

(73) Assignee: ZTE CORPORATION, Shenzhen, Guangdong (CN)

( * ) Notice: Subject to any disclaimer, the term of this patent is extended or adjusted under 35 U.S.C. 154(b) by 72 days.

(21) Appl. No.: 14/365,042

(22) PCT Filed: Apr. 25, 2012

(86) PCT No.: PCT/CN2012/074695
§ 371 (c)(1),
(2), (4) Date: Jun. 12, 2014

(87) PCT Pub. No.: WO2013/086827
PCT Pub. Date: Jun. 20, 2013

(65) Prior Publication Data
US 2015/0110014 A1    Apr. 23, 2015

(30) Foreign Application Priority Data
Dec. 15, 2011  (CN) .......................... 2011 1 0420997

(51) Int. Cl.
*H04W 76/02* (2009.01)
*H04W 12/06* (2009.01)
(Continued)

(52) U.S. Cl.
CPC ........... *H04W 76/02* (2013.01); *H04L 63/0853* (2013.01); *H04W 12/06* (2013.01); *H04W 76/022* (2013.01); *H04W 84/12* (2013.01); *H04W 88/14* (2013.01); *H04W 92/20* (2013.01)

(58) Field of Classification Search
CPC ..... H04W 76/02; H04W 12/06; H04W 84/12; H04W 88/14; H04L 63/0853
See application file for complete search history.

(56) References Cited

U.S. PATENT DOCUMENTS

| 7,499,460 B2 | 3/2009 | Csapo |
| 8,072,994 B2 | 12/2011 | Moeller |

(Continued)

FOREIGN PATENT DOCUMENTS

| CN | 101473551 A | 7/2009 |
| EP | 2252115 A1 | 11/2010 |

OTHER PUBLICATIONS

International Search Report in international application No. PCT/CN2012/074695, mailed on Sep. 20, 2012. (2 pages).

(Continued)

*Primary Examiner* — Mohammad Anwar
(74) *Attorney, Agent, or Firm* — Oppedahl Patent Law Firm LLC

(57) ABSTRACT

The present disclosure provides a WiFi network bridge, a WiFi-based communication method and system, the WiFi network bridge of the present disclosure may first acquire LTE communication link information, after receiving a WiFi connection establishment request sent by a WiFi terminal, establish a WiFi communication link with the WiFi terminal, and send authentication request information to a LTE base transceiver station; then the WiFi network bridge may judge whether the authentication succeeds, and if the authentication succeeds, a LTE communication link with the LTE base transceiver station is established according to the acquired LTE communication link information. That is to say, the present disclosure implements the backhaul of a WiFi AP network by using a LTE wireless network, avoiding the need to deploy a wire backhaul every time before a WiFi AP network is deployed, thereby the network topology of WiFi communications can be simplified, the engineering cost and usage cost can be lowered, and the satisfaction of user experiences can be improved.

13 Claims, 4 Drawing Sheets

(51) Int. Cl.
*H04L 29/06* (2006.01)
*H04W 88/14* (2009.01)
*H04W 84/12* (2009.01)
*H04W 92/20* (2009.01)

(56) References Cited

U.S. PATENT DOCUMENTS

| | | | |
|---|---|---|---|
| 8,514,756 B1* | 8/2013 | Ramachandra | H04L 61/2069 370/310 |
| 2003/0202497 A1 | 10/2003 | Csapo | |
| 2004/0008723 A1* | 1/2004 | Uchida | H04L 12/5835 370/466 |
| 2007/0030857 A1 | 2/2007 | Fulknier | |
| 2008/0159183 A1* | 7/2008 | Lindoff | H04L 1/1664 370/278 |
| 2009/0168766 A1* | 7/2009 | Eyuboglu | H04W 36/0022 370/353 |
| 2010/0058182 A1* | 3/2010 | Jung | G06F 3/04883 715/702 |
| 2010/0118846 A1 | 5/2010 | Moeller | |
| 2011/0051703 A1 | 3/2011 | Fulknier | |
| 2012/0155251 A1 | 6/2012 | Moeller et al. | |
| 2012/0155252 A1 | 6/2012 | Moeller et al. | |
| 2012/0155449 A1 | 6/2012 | Moeller et al. | |
| 2012/0163361 A1 | 6/2012 | Moeller et al. | |
| 2013/0137393 A1* | 5/2013 | Sverdlov | H04M 15/8044 455/406 |
| 2013/0286945 A1 | 10/2013 | Fulknier | |

OTHER PUBLICATIONS

English Translation of the Written Opinion of the International Search Authority in international application No. PCT/CN2012/074695, mailed on Sep. 20, 2012. (8 pages).

802.11-Based Wireless-LAN and UMTS interworking: requirements, proposed solutions and open issues, mailed on Feb. 4, 2005.

Supplementary European Search Report in European application No. 12857447.2, mailed on Jul. 14, 2015.

* cited by examiner

WIFI NETWORK BRIDGE, AND WIFI-BASED COMMUNICATION METHOD AND SYSTEM

TECHNICAL FIELD

The present disclosure relates to the field of communications, and specifically to a WiFi network bridge and a WiFi-based communication method and system.

BACKGROUND

Long Term Evolution (LTE) is a new generation of international mainstream communication standard after $3^{rd}$ generation mobile communications. In $3^{rd}$ Generation Partnership Project (3GPP), as a long term evolution technology of $3^{rd}$ generation mobile communications, LTE is standardized and the feasibility of it is researched, and the research on and standardization of LTE and its enhanced version (i.e. LTE-Advanced) are widely supported and participated by operators and equipment makers worldwide. A LTE system is based on Orthogonal Frequency Division Multiplexing (OFDM) and Multiple Input Multiple Output (MIMO) technologies, and adopts fully and optimizes packet data transmission in the mobile communication system.

WiFi is a technology which interconnects, in a wireless way, terminals such as a personal computer or a handheld device (for example, a PDA or mobile phone). With the development of technologies and the advent of IEEE 802.11a and IEEE 802.11g standards, the IEEE 802.11 standard suite is now known collectively as WiFi. WiFi provides users with wireless accesses to a broadband Internet, and it is also a convenient approach to surf the Internet at home, in an office or during a trip. As a wireless network consisting of an Access Point (AP) and a wireless network card, a WiFi wireless network has a communication distance of up to 305 meters in an open area, and of 76 meters to 122 meters in an enclosed area so as to facilitate integration with an existing wired Ethernet. WiFi has advantages of lower networking cost, rapid transmission rate (thus suitable for high-speed data transmission services), low transmitting power and lower radiation, thus its application becomes increasingly popular.

In a WiFi wireless network consisting of an AP and a wireless network card, the AP is generally referred to as a network bridge or a access point, and it is a bridge between a traditional wired LAN and a WLAN, thus any PC equipped with a wireless network card can, via the AP, share resources of the wired LAN or even a WAN. The AP serves in principle as a HUB or router with a built-in wireless transmitter, while the wireless network card is a client device responsible for receiving signals transmitted by the AP.

The current WiFi AP is generally networked in a wired way, i.e., communicating with a wire LAN in a wired way, as shown in FIG. 1, every time a WiFi AP network is deployed, a wired backhaul needs to be deployed in advance, and this results in a complicated network topology and a high engineering cost, which indirectly increases the usage cost and lowers satisfaction of user experiences.

SUMMARY

In view of the above, the present disclosure is intended to provide a WiFi bridge and a WiFi-based communication method and system, which can simplify the network topology of WiFi communications, decrease engineering cost and usage cost, and improve satisfaction of user experiences.

In order to solve the above technical problems, the present disclosure provides a WiFi-based communication method, and the method includes:

A WiFi network bridge acquires LTE communication link information;

A WiFi terminal initiates a WiFi connection establishment request to the WiFi network bridge, and establishes a WiFi communication link with the WiFi network bridge;

The WiFi network bridge sends authentication request information to a LTE base transceiver station, and after receiving an authentication success response fed by the LTE base transceiver station, establishes a LTE communication link with the LTE base transceiver station according to the acquired LTE communication link information.

In an embodiment of the present disclosure, after the WiFi network bridge establishes the LTE communication link with the LTE base transceiver station, the method further includes:

After receiving a data frame in WiFi format from the WiFi terminal, the WiFi network bridge converts the received data frame into a data frame in LTE format and sends it to the LTE base transceiver station; and/or After receiving a data frame in LTE format from the LTE base transceiver station, the WiFi network bridge converts the received data frame into a data frame in WiFi format and sends it to the WiFi terminal.

In an embodiment of the present disclosure, the WiFi network bridge converts the received data frame into a data frame in LTE format includes:

Packet header information, routing information and data information of the data frame are extracted from the received data frame in WiFi format, and the respective extracted information is combined with RF connection control information desired by a data frame in LTE format, so as to form the data frame in LTE format;

The WiFi network bridge converts the receive data frame into a data frame in WiFi format includes:

Packet header information, routing information and data information of the data frame are extracted from the received data frame in LTE format, and the respective extracted information is recombined, so as to form the data frame in WiFi format.

In an embodiment of the present disclosure, the authentication request information sent by the WiFi network bridge to the LTE base transceiver station includes: authentication information of the WiFi network bridge and/or authentication information of the WiFi terminal; accordingly, before the authentication success response fed by the LTE base transceiver station is received, the method further includes: a LTE authentication device of a LTE network performs an authentication process on the WiFi network bridge and/or the WiFi terminal according to the authentication request information.

In an embodiment of the present disclosure, the authentication information of the WiFi network bridge and the authentication information of the WiFi terminal include: USIM card information and/or certificate information.

In an embodiment of the present disclosure, the LTE communication link information includes frequency band information of a LTE network; accordingly, when the LTE communication link with the LTE base transceiver station is established, the method further includes: the WiFi network bridge chooses a corresponding frequency band so as to access the LTE network according to the frequency band information of the LTE network included in the LTE communication link information.

The present disclosure further provides a WiFi network bridge, including an information acquisition unit, an authentication unit and a communication link establishment unit, wherein The information acquisition unit is configured to acquire LTE communication link information;

The authentication unit is configured to: send authentication request information to a LTE base transceiver station, receive an authentication response fed by the LTE base transceiver station, and send the authentication response to the communication link establishment unit; and The communication link establishment unit is configured to: receive a WiFi connection establishment request sent by a WiFi terminal, establish a WiFi communication link with the WiFi terminal, and after receiving an authentication success response sent by the authentication unit, establish a LTE communication link with the LTE base transceiver station according to the LTE communication link information acquired by the information acquisition unit.

In an embodiment of the present disclosure, the WiFi network bridge further includes a data format conversion unit configured to: after receiving a data frame in WiFi format from the WiFi terminal, convert the received data frame into a data frame in LTE format and send it to the LTE base transceiver station; and/or after receiving a data frame in LTE format from the LTE base transceiver station, convert the received data frame into a data frame in WiFi format and send it to the WiFi terminal.

In an embodiment of the present disclosure, the data format conversion unit is specifically configured to: extract from the received data frame in WiFi format packet header information, routing information and data information of the data frame, and combine the respective extracted information with RF connection control information desired by a data frame in LTE format, so as to form the data frame in LTE format; and/or extract from the received data frame in LTE format packet header information, routing information and data information of the data frame, and recombine the respective extracted information, so as to form the data frame in WiFi format.

The present disclosure further provides a WiFi-based communication system, including: at least one WiFi terminal, at least one LTE base transceiver station, and at least one aforementioned WiFi network bridge, wherein The WiFi terminal is configured to initiate a WiFi connection establishment request to the WiFi network bridge;

The WiFi network bridge is configured to: acquire LTE communication link information, receive the WiFi connection establishment request sent by the WiFi terminal, and establish a WiFi communication link with the WiFi terminal; send authentication request information to the LTE base transceiver station, and after receiving an authentication success response fed by the LTE base transceiver station, establish a LTE communication link with the LTE base transceiver station according to the acquired LTE communication link information; and The LTE base transceiver station is configured to receive the authentication request information sent by the WiFi network bridge and feed an authentication response to the WiFi network bridge.

The beneficial effects of the present disclosure are: the WiFi network bridge (i.e., the WiFi AP) of the present disclosure may first acquire LTE communication link information, after receiving a WiFi connection establishment request sent by a WiFi terminal, establish a WiFi communication link with the WiFi terminal, and send authentication request information to a LTE base transceiver station; then the WiFi network bridge may judge whether the authentication succeeds, and if the authentication succeeds, a LTE communication link with the LTE base transceiver station is established according to the acquired LTE communication link information. That is to say, the present disclosure implements the backhaul of a WiFi AP network by using a LTE wireless network, avoiding the need to deploy a wire backhaul every time before a WiFi AP network is deployed, thereby the network topology of WiFi communications can be simplified, and the engineering cost and usage cost can be lowered; and the establishment of a wireless backhaul is more flexible, less restricted by the environment, and more beneficial to the establishment of a WiFi AP network, thereby improving the satisfaction of user experiences.

DETAILED DESCRIPTION

The present disclosure will be further elaborated below by specific embodiments with reference to the accompanying drawings.

Figure 2:
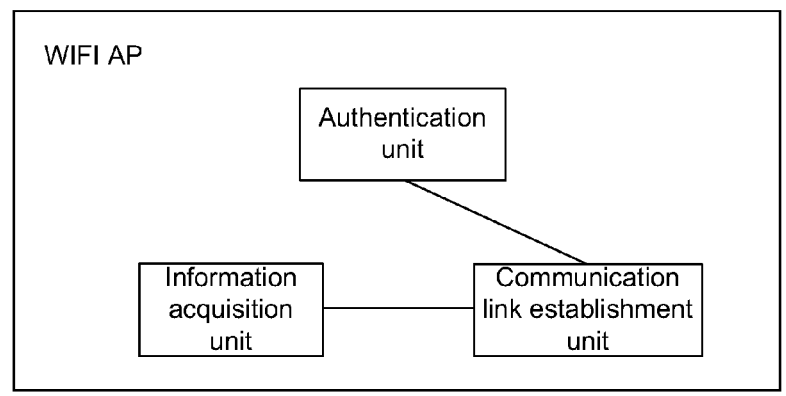
FIG. 2 is a structure block diagram of a WiFi network bridge according to an embodiment of the present disclosure.

Referring to FIG. 2, the WiFi network bridge in the embodiment (i.e., WiFi AP) includes: an information acquisition unit, an authentication unit, and a communication link establishment unit; wherein the information acquisition unit is configured to acquire LTE communication link information;

Specifically, the information acquisition unit may detect whether its application scenario has a reliable LTE access signal, i.e., whether it is within the effective coverage range of a corresponding LTE Base Transceiver Station (BTS); if Yes, corresponding LTE communication link information is acquired, and the acquired LTE link information may include frequency band information of a LTE network. When a LTE communication link is established, an optimal communication channel may be automatically selected according to the frequency information of the LTE network.

the authentication unit is configured to send authentication request information to the LTE BTS and receive an authentication response fed by the LTE BTS; and further configured to send the received authentication response to the communication link establishment unit;

Wherein the authentication response may include an authentication success response and an authentication fail response.

the communication link establishment unit is configured to receive a WiFi connection establishment request sent by a WiFi terminal and establish a WiFi communication link with the WiFi terminal sending the request; and further configured to: after receiving the authentication success response, establish the LTE communication link with the LTE BTS according to the LTE communication link information acquired by the information acquisition unit;

Here, when the LTE communication link with the LTE BTS is established, a corresponding frequency band may be selected to access the LTE network according to the frequency band information included in the LTE communication link information, for example, an optimal frequency band is automatically selected to access the LTE network so as to implement an optimal backhaul channel according to acquired frequency band information of the LTE network.

It should be noted that the WiFi terminal in the embodiment refers to a device having a WiFi function, such as a mobile phone, a portable computer or a tablet computer which has the WiFi function.

Figure 3:
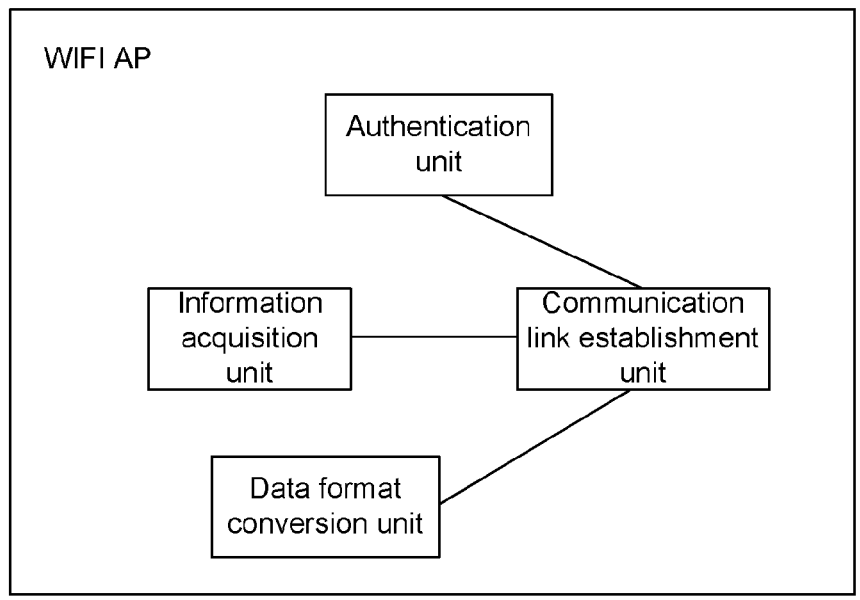
FIG. 3 is a structure block diagram of a WiFi network bridge according to another embodiment of the present disclosure.

Referring to FIG. 3, the WiFi AP in the embodiment further includes a data format conversion unit, which is configured to: after receiving a data frame in WiFi format from a WiFi terminal, convert the data frame into a data frame in LTE format and send it to a LTE BTS, so that the WiFi terminal can access the Internet through a LTE network; and further configured to: after receiving a data frame in LTE format from a LTE BTS, convert the data frame into a data frame in WiFi format, so that data received from the Internet can be sent to the WiFi terminal through a WiFi network. The specific process for the data format conversion unit to implement data format conversion is as follows.

after receiving the data frame in WiFi format from the WiFi terminal, the data format conversion unit extracts from the received data frame in WiFi format packet header information, routing information and data information of the data frame, and then after RF connection control information desired by a data frame in LTE format is added, recombines the respective information extracted from the data frame in WiFi format with the RF connection control information desired by the data frame in LTE format to form the data frame in LTE format, so that the WiFi terminal can access the Internet through a LTE network. When received data in WiFi format includes multiple sub-frames, respective data sub-frame in WiFi format may first be disassembled from the received data in WiFi format, then packet header information, routing information and data information of respective sub-frame may be extracted from a corresponding sub-frame, and recombined into a data sub-frame in LTE format according to the above way, and finally a complete data frame in LTE format is formed by combining all acquired data sub-frames in LTE format.

Accordingly, after receiving the data frame in LTE format from the LTE BTS, the data format conversion unit removes RF connection control information in the data frame, extracts therefrom packet header information, routing information and data information of the data frame and recombines them so as to form the data frame in WiFi format, and then the data frame in WiFi format is sent to the terminal through a WiFi network. When received data in LTE format includes multiple sub-frames, respective data sub-frame in LTE format may first be disassembled from the received data in LTE format, RF connection control information in each sub-frame may be removed, then packet header information, routing information and data information of respective sub-frame may be extracted, and finally recombined into the data frame in WiFi format according to the above way.

The authentication request information sent by the authentication unit of the WiFi AP in the embodiment may include authentication information of the WiFi AP itself and/or authentication information of the WiFi terminal; for the LTE authentication device of a LTE network, it performs an authentication process on the WiFi network bridge and/or the WiFi terminal according to received authentication request information. In this example, the specific authentication information included in the authentication request information may be selected according to strategies for managing the WiFi AP by LTE. Several cases will be exemplified below for further elaboration.

1. A WiFi AP is authorized, and WiFi terminals under the WiFi AP can access the Internet without limit; in general, the WiFi AP has an effectively-authorized USIM card and/or certificate, at this point, the authentication request information sent by the authentication unit of the WiFi AP to the LTE BTS may only include the authentication information of the WiFi AP itself, i.e, the USIM card information and/or certificate information of the WiFi AP, then the authentication device of a LTE network may perform an authentication process only on the USIM card information and/or certificate information of the WiFi AP.

2. A WiFi AP is authorized, and a WiFi terminal under the WiFi AP are authenticated, thus only a WiFi terminal complying with a safety regulation can access the Internet through a LTE base station, at this point, the authentication request information sent by the authentication unit of the WiFi AP to the LTE BTS includes the authentication information of the WiFi AP itself and the authentication information of the WiFi terminal, i.e., the USIM card information and/or certificate information of the WiFi AP and the USIM card information and/or certificate information of the WiFi terminal; then the authentication device of a LTE network performs an authentication process not only on the USIM card information and/or certificate information of the WiFi AP, but also on the USIM card information and/or certificate information of the WiFi terminal, and only when both the WiFi AP and the WiFi terminal pass the authentication, the WiFi terminal may access the Internet through a LTE base station.

3. A WiFi AP has full authorities, i.e., the WiFi AP having a LTE access function may freely access a LTE network, and authentication management is performed only on a WiFi terminal under the WiFi AP, at this point, the authentication request information sent by the authentication unit of the WiFi AP to the LTE BTS may only include the USIM card information and/or certificate information of the WiFi terminal; then the authentication device of a LTE network may perform an authentication process only on the USIM card information and/or certificate information of the WiFi terminal, and only when passing the authentication, the WiFi terminal may access the Internet through a LTE base station.

In this example, specific strategies for managing a WiFi AP by the device of a LTE network may be selected and set depending on practical conditions. It should be noted that if a WiFi AP itself belongs to an authentication-free type of AP, an effectively-authorized USIM card and/or certificate of the WiFi terminal are desired for being authenticated; when the WiFi terminal needs to use the WiFi function, a USIM card or certificate authentication request can be initiated directly to the LTE authentication device of a LTE network through the WiFi AP; if the authentication succeeds, the WiFi AP establishes a WiFi communication link in the WiFi terminal side and establishes a LTE communication link in the LTE BTS side, i.e., establishes an optimal wireless backhaul channel according to the LTE communication link information acquired previously.

Figure 4:
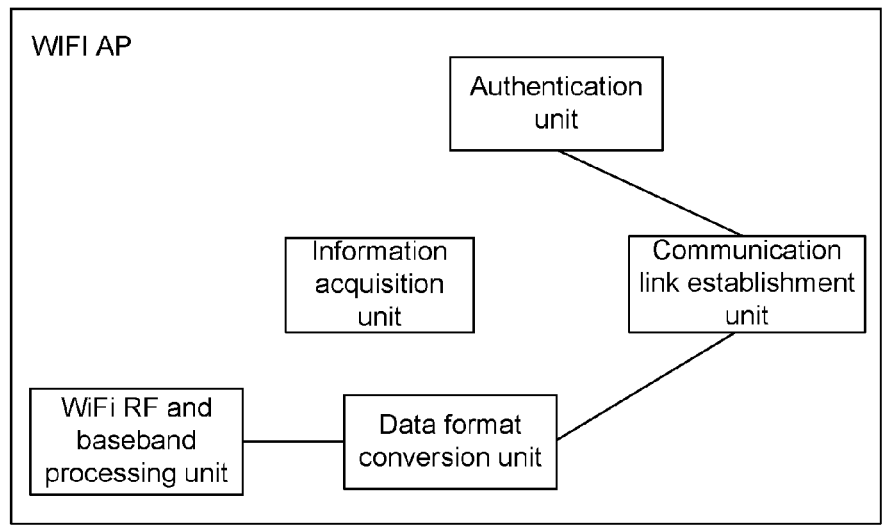
FIG. 4 is a structure block diagram of a WiFi network bridge according to yet another embodiment of the present disclosure.

Referring to FIG. 4, the WiFi AP in the embodiment further includes a WiFi RF and baseband processing unit configured to provide the coverage of the WiFi AP and configured to process a normal WiFi flow.

It should be noted that the WiFi AP in the embodiment has no Ethernet electrical ports, thus when LTE is not used as a wireless backhaul, the WiFi AP in the embodiment may still determine whether it is desired to perform authentication in a LTE network, so as to ensure whether the authentication is managed by a LTE authentication device.

Figure 1:
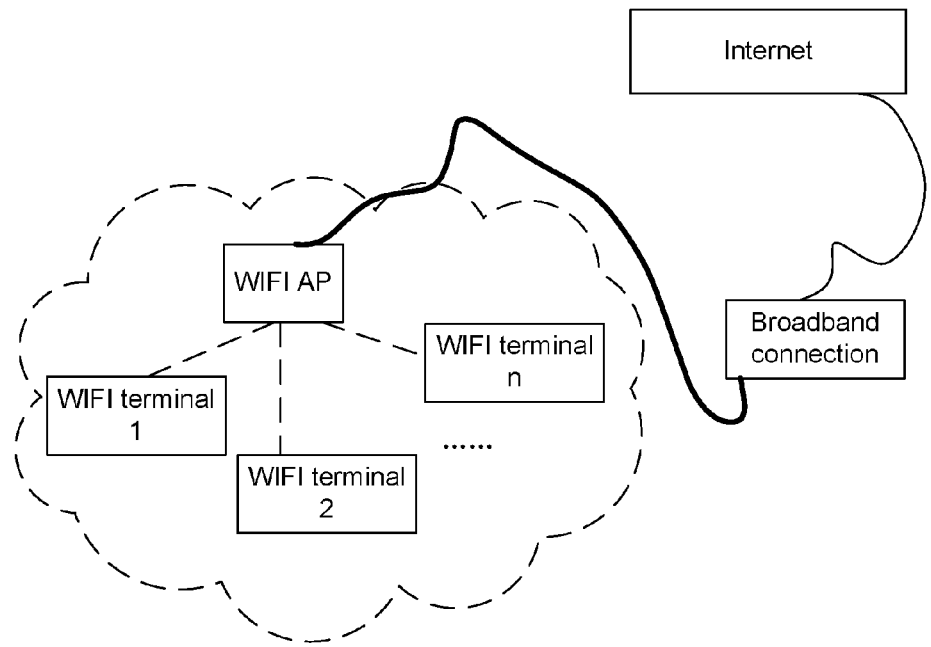
FIG. 1 is a structure block diagram of a WiFi network bridge with a traditional wired backhaul.
Figure 5:
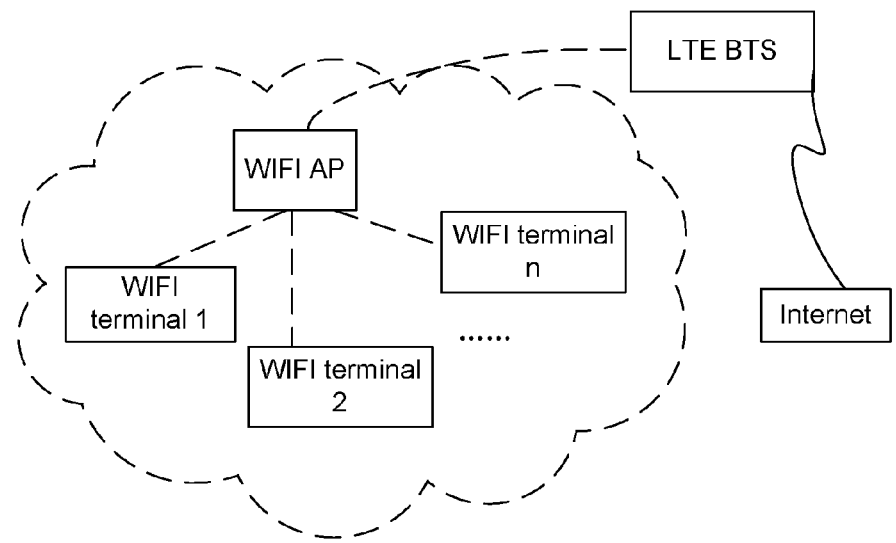
FIG. 5 is a block diagram of a WiFi-based communication system according to an embodiment of the present disclosure.

Referring to FIG. 5, the embodiment further provides a WiFi-based communication system, and the system includes: at least one aforementioned WiFi terminal, at least one aforementioned LTE BTS, and at least one aforementioned WiFi AP. It can be seen from FIG. 4 that the WiFi AP access the Internet through the LTE BTS, i.e., the backhaul established by the WiFi AP is a wireless backhaul, thus it is not desired to deploy a wired backhaul every time before a WiFi AP network is deployed, which is the case for the system shown in FIG. 1, thereby the network topology of WiFi communications can be simplified, and the engineering cost and usage cost can be lowered; and the establishment of a wireless backhaul is more flexible, less restricted by the environment, and more beneficial to the establishment of a WiFi AP network, thereby improving the satisfaction of user experiences.

Figure 6:
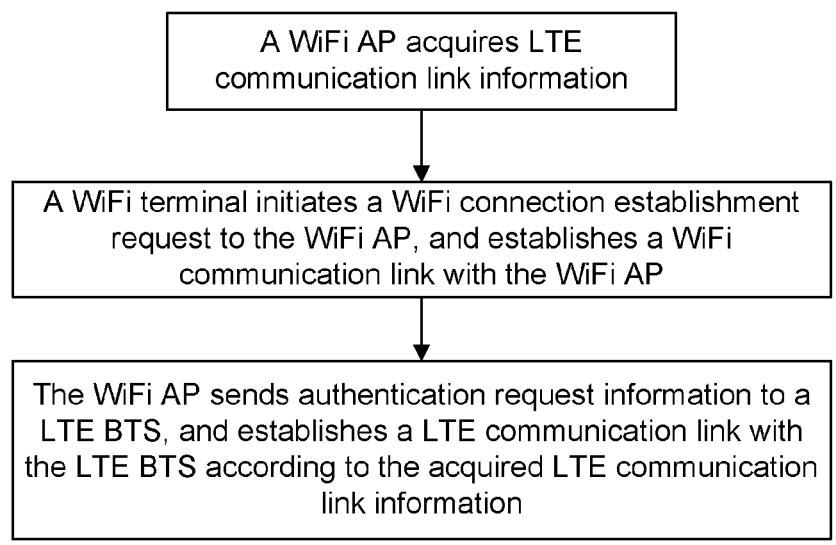
FIG. 6 is a flow chart of a WiFi-based communication method according to an embodiment of the present disclosure.

The embodiment further provides a WiFi-based communication method, referring to FIG. 6, the method includes the following steps:

A WiFi AP acquires LTE communication link information according to the aforementioned way;

Here, the LTE communication link information includes the frequency information of a LTE network;

A WiFi terminal initiates a WiFi connection establishment request to the WiFi AP, and establishes a WiFi communication link with the WiFi AP;

The WiFi AP sends authentication request information to a LTE BTS, the LTE authentication device of the LTE network performs an authentication process on the WiFi AP and/or the WiFi terminal according to the authentication request information, and feeds the authentication result back to the WiFi AP through the LTE BTS; after receiving an authentication success response fed by the LTE BTS, the WiFi AP establishes a LTE communication link with the LTE BTS according to the LTE communication link information acquired by the WiFi AP.

Here, the authentication request information sent includes the authentication information of the WiFi AP and/or the authentication information of the WiFi terminal.

Wherein after the LTE communication link between the WiFi AP and the LTE BTS is established, the method further includes:

After receiving a data frame in WiFi format from the WiFi terminal, the WiFi AP converts the received data frame into a data frame in LTE format and sends it to a LTE BTS, so that the WiFi terminal can access the Internet through a LTE network to implement communications; similarly, after receiving a data frame in LTE format from the LTE BTS, the WiFi AP converts the received data frame into a data frame in WiFi format and sends it to the WiFi terminal, so that data received from the Internet can be sent to the WiFi terminal through a WiFi network.

It can be seen from what described above that the present disclosure implements the backhaul of a WiFi AP by using the high broadband capacity advantage of a LTE network, so as to perform corresponding data transmission, thus avoiding the need to deploy a wire backhaul every time before a WiFi AP network is deployed, which is the case in prior art, thereby the network topology of WiFi communications can be simplified, and the engineering cost and usage cost can be lowered; and the establishment of a wireless backhaul is more flexible, less restricted by the environment, and more beneficial to the establishment of a WiFi AP network, thereby improving the satisfaction of user experiences.

What described are further elaboration made in combination with specific embodiments of the present disclosure, and it should not be considered that the specific embodiments of the present disclosure are limited to these elaboration. For those skilled in the art, several simple deductions or replacements may be made without departing from the spirit of the present disclosure, and they should be considered as being within the scope of the present disclosure.

The invention claimed is:

1. A WiFi-based communication method, comprising:
   acquiring, by a WiFi network bridge, LTE communication link information; wherein the LTE communication link information comprises frequency band information of a LTE network;
   initiating, by a WiFi terminal, a WiFi connection establishment request to the WiFi network bridge, and establishing a WiFi communication link with the WiFi network bridge;
   sending, by the WiFi network bridge, authentication request information to a LTE base transceiver station, and after receiving an authentication success response fed by the LTE base transceiver station, establishing a LTE communication link with the LTE base transceiver station according to the acquired LTE communication link information;
   when the LTE communication link with the LTE base transceiver station is established, the method further comprises: choosing, by the WiFi network bridge, a corresponding frequency band so as to access the LTE network according to the frequency band information of the LTE network included in the LTE communication link information.

2. The method according to claim 1, wherein after the WiFi network bridge establishes the LTE communication link with the LTE base transceiver station, the method further comprises:
   after receiving a data frame in WiFi format from the WiFi terminal, converting, by the WiFi network bridge, the received data frame into a data frame in LTE format, and sending it to the LTE base transceiver station; and/or
   after receiving a data frame in LTE format from the LTE base transceiver station, converting, by the WiFi network bridge, the received data frame into a data frame in WiFi format, and sending it to the WiFi terminal.

3. The method according to claim 2, wherein the converting, by the WiFi network bridge, the received data frame into a data frame in LTE format comprises:
   extracting, from the received data frame in WiFi format, packet header information, routing information and data information of the data frame, and combining the respective extracted information with RF connection control information desired by a data frame in LTE format, so as to form the data frame in LTE format;
   the converting, by the WiFi network bridge, the received data frame into a data frame in WiFi format comprises:
   extracting, from the received data frame in LTE format, packet header information, routing information and data information of the data frame, and recombining the respective extracted information, so as to form the data frame in WiFi format.

4. The method according to claim 3, wherein the authentication request information sent by the WiFi network bridge to the LTE base transceiver station comprises: authentication information of the WiFi network bridge and/or authentication information of the WiFi terminal;

before the authentication success response fed by the LTE base transceiver station is received, the method further comprises: performing an authentication process, by a LTE authentication device of a LTE network, on the WiFi network bridge and/or the WiFi terminal according to the authentication request information.

5. The method according to claim 4, wherein the authentication information of the WiFi network bridge and the authentication information of the WiFi terminal comprise: USIM card information and/or certificate information.

6. The method according to claim 2, wherein the authentication request information sent by the WiFi network bridge to the LTE base transceiver station comprises: authentication information of the WiFi network bridge and/or authentication information of the WiFi terminal;
before the authentication success response fed by the LTE base transceiver station is received, the method further comprises: performing an authentication process, by a LTE authentication device of a LTE network, on the WiFi network bridge and/or the WiFi terminal according to the authentication request information.

7. The method according to claim 6, wherein the authentication information of the WiFi network bridge and the authentication information of the WiFi terminal comprise: USIM card information and/or certificate information.

8. The method according to claim 1, wherein the authentication request information sent by the WiFi network bridge to the LTE base transceiver station comprises: authentication information of the WiFi network bridge and/or authentication information of the WiFi terminal;
before the authentication success response fed by the LTE base transceiver station is received, the method further comprises: performing an authentication process, by a LTE authentication device of a LTE network, on the WiFi network bridge and/or the WiFi terminal according to the authentication request information.

9. The method according to claim 8, wherein the authentication information of the WiFi network bridge and the authentication information of the WiFi terminal comprise: USIM card information and/or certificate information.

10. A WiFi network bridge, comprising an information acquisition unit, an authentication unit and a communication link establishment unit, wherein
the information acquisition unit is configured to acquire LTE communication link information; wherein the LTE communication link information comprises frequency band information of a LTE network;
the authentication unit is configured to: send authentication request information to a LTE base transceiver station, receive an authentication response fed by the LTE base transceiver station, and send the authentication response to the communication link establishment unit; and
the communication link establishment unit is configured to: receive a WiFi connection establishment request sent by a WiFi terminal, establish a WiFi communication link with the WiFi terminal, and after receiving an authentication success response sent by the authentication unit, establish a LTE communication link with the LTE base transceiver station according to the LTE communication link information acquired by the information acquisition unit;
the communication link establishment unit is further configured to: choose a corresponding frequency band so as to access the LTE network according to the frequency band information of the LTE network included in the LTE communication link information.

11. The WiFi network bridge according to claim 10, wherein the WiFi network bridge further comprises a data format conversion unit configured to: after receiving a data frame in WiFi format from the WiFi terminal, convert the received data frame into a data frame in LTE format and send it to the LTE base transceiver station; and/or after receiving a data frame in LTE format from the LTE base transceiver station, convert the received data frame into a data frame in WiFi format and send it to the WiFi terminal.

12. The WiFi network bridge according to claim 11, wherein the data format conversion unit is configured to: extract from the received data frame in WiFi format packet header information, routing information and data information of the data frame, and combine the respective extracted information with RF connection control information desired by a data frame in LTE format, so as to form the data frame in LTE format; and/or extract from the received data frame in LTE format packet header information, routing information and data information of the data frame, and recombine the respective extracted information, so as to form the data frame in WiFi format.

13. A WiFi-based communication system, comprising: at least one WiFi terminal, at least one LTE base transceiver station, and at least one WiFi network bridge, wherein
the WiFi terminal is configured to initiate a WiFi connection establishment request to the WiFi network bridge;
the WiFi network bridge is configured to: acquire LTE communication link information, receive the WiFi connection establishment request sent by the WiFi terminal, and establish a WiFi communication link with the WiFi terminal; send authentication request information to the LTE base transceiver station, and after receiving an authentication success response fed by the LTE base transceiver station, establish a LTE communication link with the LTE base transceiver station according to the acquired LTE communication link information;
wherein the LTE communication link information comprises frequency band information of a LTE network; the WiFi network bridge is further configured to choose a corresponding frequency band so as to access the LTE network according to the frequency band information of the LTE network included in the LTE communication link information; and
the LTE base transceiver station is configured to receive the authentication request information sent by the WiFi network bridge and feed an authentication response to the WiFi network bridge.

\* \* \* \* \*